United States Patent
Koh

(10) Patent No.: US 8,789,779 B2
(45) Date of Patent: Jul. 29, 2014

(54) FOOD WASTE DISPOSAL SYSTEM

(76) Inventor: Chun Il Koh, Seoul (KR)

(*) Notice: Subject to any disclaimer, the term of this patent is extended or adjusted under 35 U.S.C. 154(b) by 349 days.

(21) Appl. No.: 13/304,516

(22) Filed: Nov. 25, 2011

(65) Prior Publication Data

US 2013/0099034 A1   Apr. 25, 2013

(30) Foreign Application Priority Data

Oct. 24, 2011   (KR) .................. 10-2011-0108507

(51) Int. Cl.
*B02C 19/22*   (2006.01)
*C05F 17/02*   (2006.01)

(52) U.S. Cl.
CPC ............. *C05F 17/02* (2013.01); *C05F 17/0264* (2013.01)
USPC ..... 241/60; 241/101.3; 241/101.8; 241/260.1

(58) Field of Classification Search
CPC .............. B01F 7/04; B65F 7/00; B02B 1/08; B02B 5/02; B02C 21/00; B02C 19/22; B02C 2201/06
USPC ......... 241/73, 260.1, 101.2, 101.78, 37.5, 60, 241/101.3, 101.8
See application file for complete search history.

(56) References Cited

U.S. PATENT DOCUMENTS

| | | | | |
|---|---|---|---|---|
| 2,509,379 A | * | 5/1950 | Vasel | 241/66 |
| 2,571,300 A | * | 10/1951 | Offenhauser | 241/101.8 |
| 3,865,319 A | * | 2/1975 | Hoffman | 241/188.1 |
| 4,852,817 A | * | 8/1989 | Tipton | 241/260.1 |
| 7,735,761 B2 | | 6/2010 | Koh | |
| 7,762,713 B2 | | 7/2010 | Koh | |

FOREIGN PATENT DOCUMENTS

| | | | |
|---|---|---|---|
| DE | 10241315 A1 | * | 3/2004 |
| GB | 2124194 A | * | 2/1984 |
| KR | 1019980065256 A | | 10/1999 |
| KR | 1020090030394 A | | 3/2009 |
| KR | 1020090106032 A | | 10/2009 |
| KR | 1020110004592 A | | 1/2011 |
| WO | WO 01/49418 A1 | * | 7/2001 |

* cited by examiner

*Primary Examiner* — Mark Rosenbaum

(74) *Attorney, Agent, or Firm* — Lee Patent International

(57) ABSTRACT

The present invention provides a food waste disposal system comprising a load cell located between the housing fixture and the support frame so that the load cell measures the weight of the food waste disposal system and sends the warning message to a control touch panel installed on the front upper plate of the food waste disposal system in case the user inserts more food waste than maximum allowable weight limit of the food waste disposal system. Two rotational shafts are aligned in parallel along the horizontal direction of the food waste disposal system with a screw-shaped ribbon connected to the rotational shaft by a ribbon supporter and a mixing blade is installed on at the one end of the rotational shaft, so that food waste inserted in the mixing basin is effectively mixed, crushed, decomposed and drained out through a washing chamber.

3 Claims, 7 Drawing Sheets (a)

(b)

FOOD WASTE DISPOSAL SYSTEM

BACKGROUND OF THE INVENTION

1. Field of the Invention

The present invention relates to a food waste disposal system, which is provided with two rotational shafts, a screw-shaped ribbon attached along the rotational shaft, and a mixing blade installed at the end of the rotational shaft, so that the food waste in the mixing basin is continuously mixed and crushed by the rotation of the screw-shaped ribbon and a mixing blade and decomposed by the microbes.

2. Description of the Prior Art

Generally, organic waste, such as food waste, contains a large amount of fibrous vegetable and animal material, protein, carbohydrates and calcium. Accordingly, if the organic waste is disposed of as it is in a landfill, without being decomposed, leachate generated from the organic waste permeates into the soil, resulting in the contamination of ground water.

Conventional food waste disposal technologies using microbes are disclosed in Korea Utility Model Publication Nos. 20-1995-5245, 20-1995-7541, 20-1995-7395, Korean Patent Laid-Open Publication Nos. 20-1994-24804. These technologies are related to methods and apparatuses of fertilizing and composting food waste or organic waste.

The conventional methods and apparatuses can reduce some of the organic matter in food waste or organic waste, but are insufficient with respect to disposal efficiency and capacity because they take a long period to decompose organic matter and they cannot completely decompose organic matter. As a result, odors are generated due to the hazardous gas generated upon the incomplete decomposition of food waste.

Korean Utility Model No. 20-270982 discloses "Apparatus for Decomposing Organic Waste", Korean Patent Laid-Open Publication No. 10-2006-19663 discloses "Apparatus for Treating Food Waste", and Korean Patent No. 10-535699 discloses "Structure of Mixing Basin of Apparatus for Treating Food Waste".

Korean Utility Model Registration No. 20-20982 discloses "Apparatus for Decomposing Organic Waste", which comprises a rotational shaft having a plurality of arm blades, installed along a central horizontal line of a cell casing provided in a housing, a rotation device which includes a gear motor, a driving sprocket, a linking sprocket, and a chain, for rotating the rotational shaft, a hot water tank, and a sprayer with a plurality of spray nozzles, which is installed in an upper part of the cell casing for spraying hot water from the hot water tank into the cell casing, in which the inner temperature of the cell casing can be adjusted by selectively supplying the hot water from the hot water tank, which is provided with a pre-heater.

Korean Patent Laid-Open Publication No. 10-2006-19663 discloses "Apparatus for Treating Food Waste", in which food wasted introduced through an entrance formed in an upper portion of a treatment basin is pulverized when it passes through a pulverizing mill and falls down, the pulverized food waste is mixed by mixing blades and decomposed, and then the decomposed food waste is discharged, in which the treatment basin is cleaned by spraying water using a sprayer installed in an upper portion of the treatment basin.

Korean Patent No. 10-535699 discloses "Structure of Mixing Basin of Apparatus for Treating Food Waste" which comprises an outer casing having mixing blades therein, an upper plate which has a drain with a screen thereon and is fixed to the lower end portion of the outer casing, and a lower plate having a drain in the center portion thereof, which is provided under the upper plate and is integrated with the upper plate, in which food waste introduced through an entrance of the outer casing and onto the upper plate is mixed by the mixing blades, and leachate from the food waste is drained through the screen, flows down to the lover plate, and is then discharged through the drain provided to the lower plate.

The above-described food waste disposal apparatuses are operated suing manual switches in an analog manner. Accordingly, they have problems in that the manipulation thereof is inconvenient and in that they cannot be selectively operated in either an automatic manner or a manual manner. Further, since hot water cannot be supplied into the cell casing (mixing basin), the food waste treatment capacity and efficiency thereof are low, and it is difficult to clean the inside of the cell casing, and thus odors linger around the apparatus. Further, since a cleansing device for cleansing the lower plate, on which leachate collects, is not provided, odors occur. Still further, since the cell casing (mixing basin) does not have a leachate discharge device, leachate overflowing from the cell casing cannot be easily discharged, so that the apparatus cannot be smoothly operated.

In order to overcome the disadvantage of problems above, U.S. Pat. Nos. 7,735,761 and 7,762,713 to the inventor discloses a food waste disposal system by putting microbes during a process of drying the food waste, comprising a mixing basin installed in a housing, and a rotational shaft with a plurality of mixing blades.

Although the food waste disposal system of U.S. Pat. Nos. 7,735,761 and 7,762,713 have resolved the prior art's drawbacks, in the mixing process of food waste inside the housing, even there is a plurality of mixing blades rotating in one direction, the food waste inside the housing is not mixed enough to be decomposed thoroughly and some of the food waste tends to move to one local area, causing dead zone where mixing blades cannot be reached. During continuous operation of the food waste disposal system, the accumulation of the food waste moved to the dead zone is significant and the efficiency of the food waste disposal system becomes deteriorated. Also, a rotational shaft assembly driven by the chain requires the lubrication in regular basis during the long period of operation. Also, there is a possibility that the breakage of the chain when the large amount of load is imposed on the shaft assembly, thus there needs to revise the motor drive system which is more stable than the chain driven system.

Also, the users tend to put more food waste inside the mixing basin than the maximum allowable weight of the food waste disposal system because they try to cut the garbage expense down by putting more waste into the machine. The over usage of the food waste disposal system causes severe load to the rotational assembly, reducing decomposition process of the food waste, further resulting in the breakage of the system. It is not practically feasible to educate the user to follow the instruction manual. So, there needs to revise the system in the machine side to protect the food waste disposal system from overloading.

Also, In the process that the decomposed food waste goes down to the washing chamber through the perforated plate located at the bottom of the mixing basin and the water sprayed by the washing nozzle cleans the food waste sending all the residues to the drain, the food waste containing high viscosity is hard to pass through the perforated plate, causing the perforation to be clogged. So, besides the cleansing mechanism by the water spraying, there needs a device that mechanically brush out the perforated plate to unclog any holes in the perforated plate.

SUMMARY OF THE INVENTION

Therefore, the present invention has been made in view of the above problems with an object to provide an improved food waste disposal system. To resolve the problem that the user tends to put more food than the maximum allowable weight of food into the food waste disposal system, the present inventions provides an improved food waste disposal system comprising a housing fixture installed at the bottom and corners of the food waste disposal system, four legs connected to each corner of the housing fixture, and a load cell inserted between the housing fixture and the leg, by which the measured signal of the weight of the food waste disposal system is sent to the Programmable Logic Controller (PLC) of the food waste disposal system, and PLC compares the signal with the maximum allowable weight previously set as a default value. In case of the signal by the load cell is more than the allowable weight setting, PLC sends the warning message to the touch screen installed on the upper cover of the food waste disposal system or turns on the lamp connected to the outside of the food waste disposal system so that the user notice the overloading and eventually shut down the food waste disposal system to prevent any further breakage of the system.

It is another object of the present invention to provide a d food waste disposal system in which a screw-shaped ribbon is formed and attached along the rotational shaft by a ribbon supporter, and two individual shafts rotate by the motor installed at the end of the shaft respectively to move and mix food waste inside the mixing basin continuously, a mixing blade installed at the end of the rotating shaft to scoop and transfer the food waste to the other side of the shaft, and the two shaft rotate in opposite direction to provide the continuous flow of food waste movement inside the mixing basin, increasing the decomposition process by microbes.

It is a further object of the present invention to resolve the clogging problem of the food waste containing high viscosity in the process that the decomposed food waste moves to the washing chamber through the perforated plate and the water sprayed by the washing nozzle cleans the food waste sending all the residues to the drain. The present invention comprises a linear motion device installed inside the washing chamber, in which the brush is attached perpendicular to the direction of linear motion, so that the brush mechanically cleans the hole on the perforated plates when the linear motion device moves inside the washing chamber, thus washing chamber is cleaned thoroughly by the water and brush at the same time.

Lastly, the object of the present invention is to provide a solution for the issue that the door in the previous invention is designed to open vertically, up and down motion, causing the user safety concern when the door is closed by its own weight in case of the system malfunction. Provided food waste disposal system comprises the door opens and closes in side way, left to right motion, of which the material is transparent plastic, the user being able to see inside the mixing basin during the operation to check out the status of the operation in real time. Also, the change of the door system from vertical to horizontal opening simplifies the mechanical component associated, which enhances the durability of the door parts of the food waste disposal system.

BRIEF DESCRIPTION OF THE DRAWING

The invention is more easily understood when the following detailed description of the preferred embodiments of the invention and the accompanying drawings are explained.

DETAILED DESCRIPTION OF THE PREFERRED EMBODIMENTS

Figure 1:
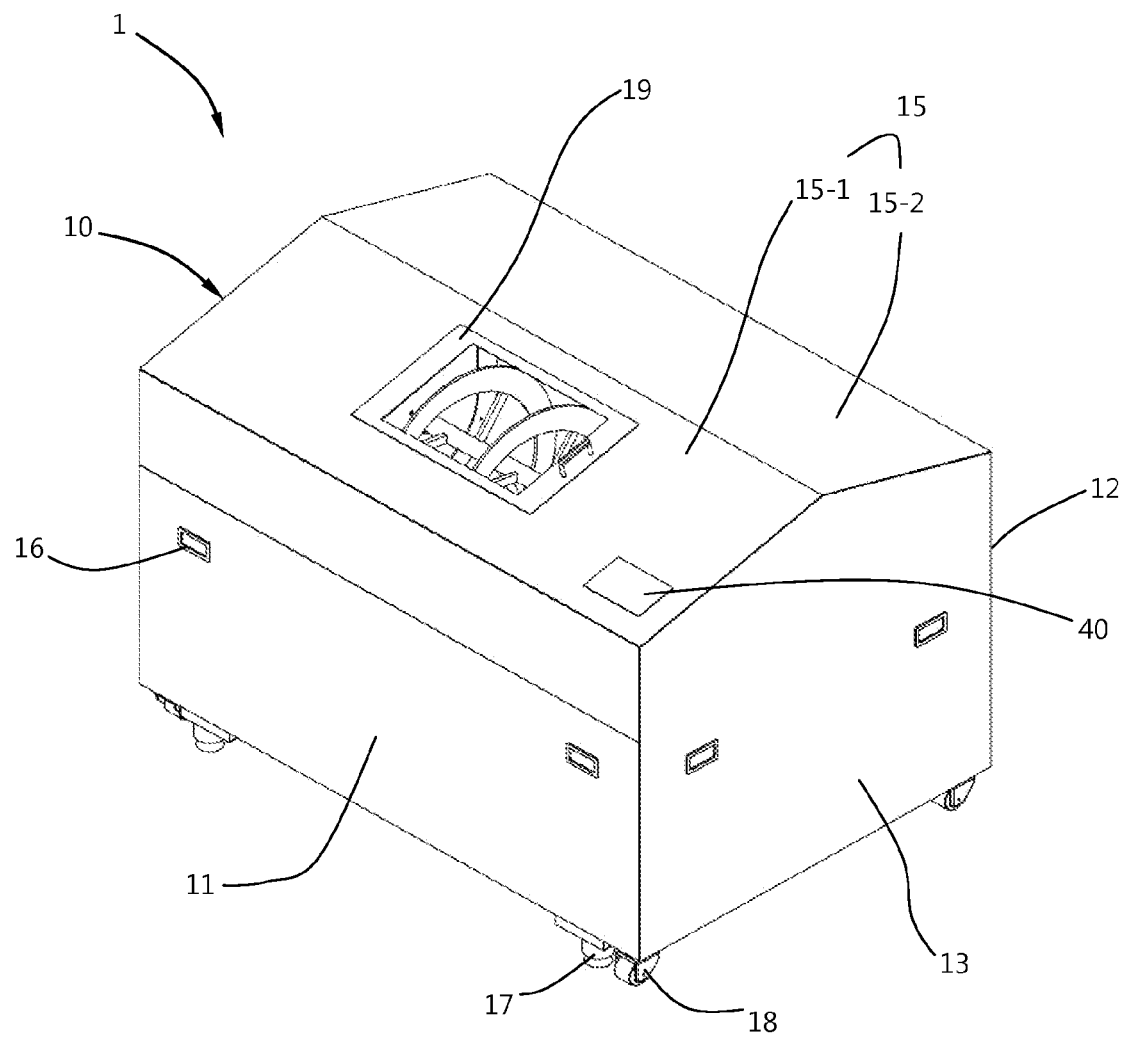
FIG. 1 illustrates a perspective view of the food waste disposal system according to one embodiment of the present invention.
Figure 2:
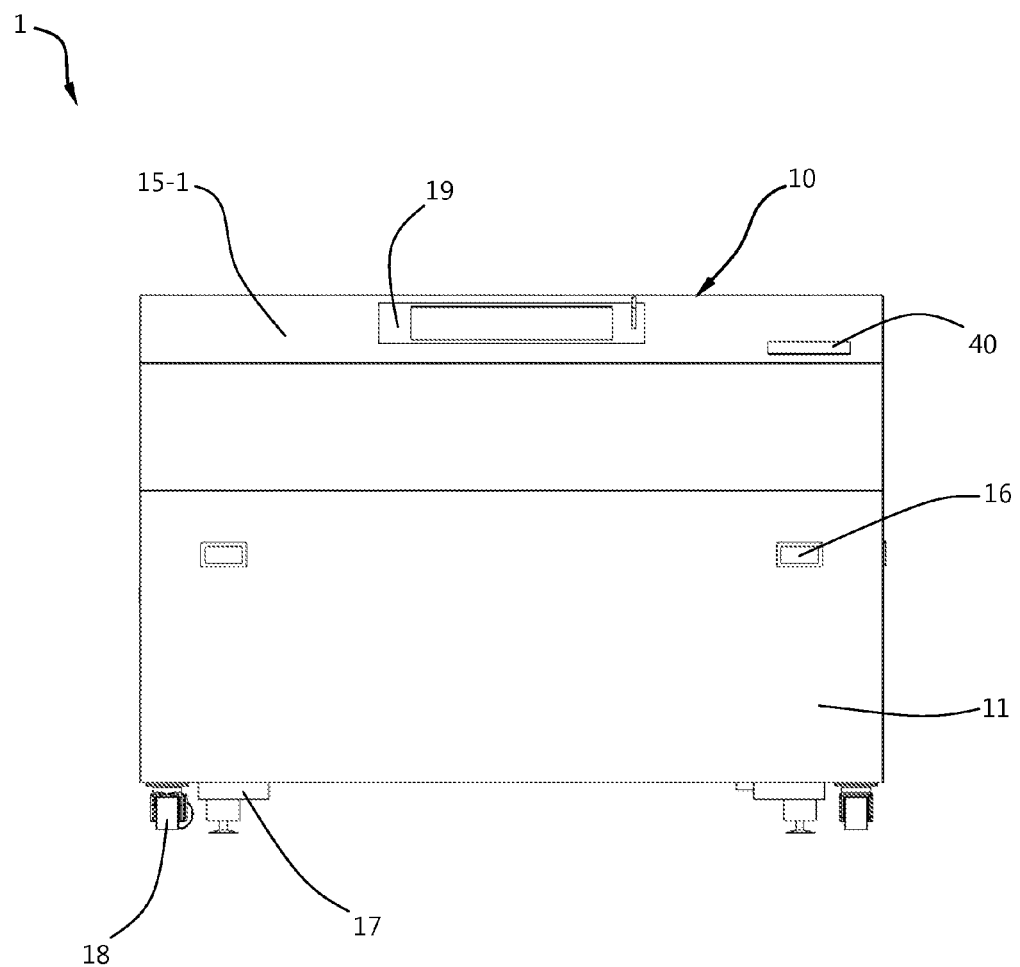
FIG. 2 illustrates a side view of the food waste disposal system according to one embodiment of the present invention.

The above-described objects, advantageous effects and features of the present invention will be apparent from the following description with reference to the accompanying drawings.

The structure of the food waste disposal system 1 according to one embodiment of the present invention will be described below.

A housing 10 for protecting a mixing basin 20 installed therein comprises a support frame 14, a front plate 11, a rear plate 12, and a pair of side plate 13, which are integrated as a single body. The housing 10 further has an upper plate 15 comprising an inclined front upper plate 15-1 and a rear upper plate 15-2.

Each of the front plate 11 and the side plates 13 is provided with a plurality of handles 16, so that the food waste disposal system 1 can be easily transported and moved. The lower corners of the support frame 14 are provided with frame holders 17 and casters 18 so that the food waste disposal system 1 can be moved, or, alternatively, fixed in place.

Figure 3:
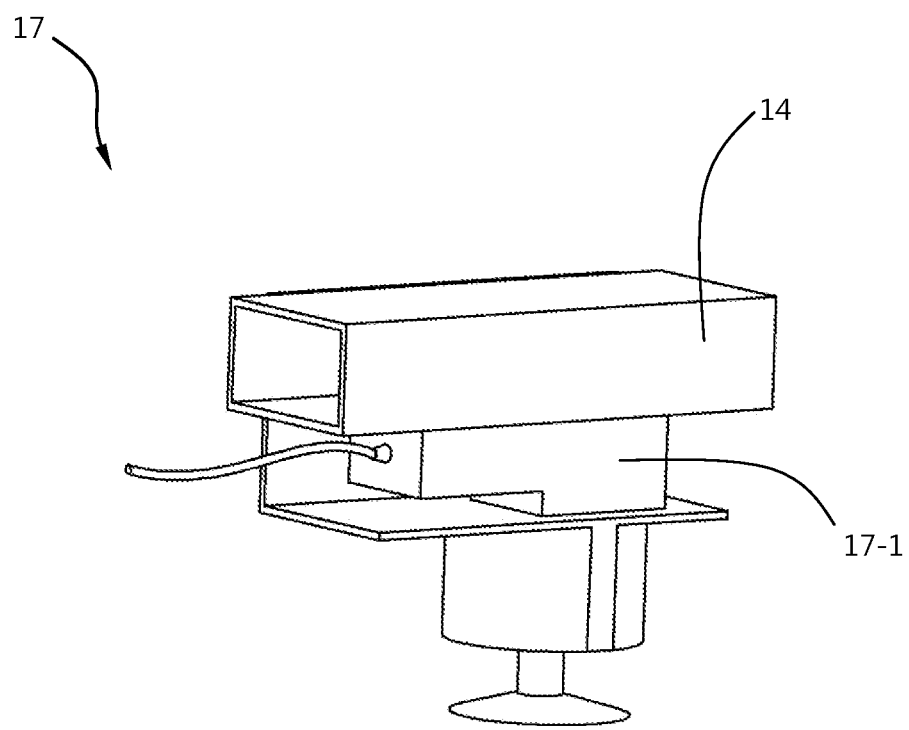
FIG. 3 illustrates a perspective view of the load cell located between the base frame and the leg of the food waste disposal system according to one embodiment of the present invention.

As illustrated in FIG. 3, the housing fixture 17 is fixed to the support frame 14 at four lower corners of the food waste disposal system 1. A load cell 17-1 is located between the housing fixture 17 and the support frame 14 so that the load cell 17-1 measures the total weight of the food waste system 1. When the user inserts the food waste into the mixing basin 20 of the food waste disposal system 1 more than maximum allowable amount suggested by the manufacturer, the load cell 17-1 detects the overloading of food waste and sends the signal to the PLC embedded in the food waste disposal system 1. PLC compares the signal from the load cell 17-1 with the allowable maximum weight setting by default. In case the signal from the load cell 17-1 is greater than the default setting value, PLC sends warning message to a control touch panel 40 installed on the front upper plate 15-1 of the food waste disposal system 1, so that the user realizes the overloading of food waste.

The automatic weight detecting unit using the load cell 17-1 protects the food waste system 1 from the user's mistake of putting more food waste than allowable limit, thus prevents any breakage of the system due to the overload to the drive system and automatically educates the user the proper usage of the food waste disposal system 1.

The inclined front upper plate 15-1 has an introduction hole 15-3 in a center portion thereof, and a door 19 is provided to cover the introduction hole 15-3. A control touch panel 40, which controls the operation of the food waste disposal system 1 when it is touched, is installed around the door 40.

The control touch panel 40 displays a basic menu and each item in the basic menu can be selected in a touching manner and the functions of the food waste disposal system can be performed when the items in the basic menu are selected.

The menu displayed on the control touch panel 40 is composed of an automatic operation mode and a manual operation mode, so that the food waste disposal system can be operated in the automatic operation mode or in the manual operation mode according to the item selected on the menu. If the item of the automatic operation mode is selected, the food waste disposal system 1 is operated as programmed. If the item of the manual operation mode is selected, on and off switch for turning on and off a plurality of functions of the food waste disposal system 1, so that each function can be performed or skipped according to selection.

If an item of a total monitoring mode in the menu is selected, the operating status of each function of the food waste system 1 is displayed on the control touch panel 40 regardless of whether the food waste disposal system 1 is operated in the automatic operation mode or in the manual operation mode.

The food waste disposal system 1 provides a time setting mode, an alarm message mode and a function setting mode. Accordingly, periods for functions, such as total operation, agitator operation, water supply, washing chamber, decomposition agent operation, discharge valve, and pause can be set. Further, whenever every function starts and ends, such starting and ending can be indicated with an alarm.

Figure 4:
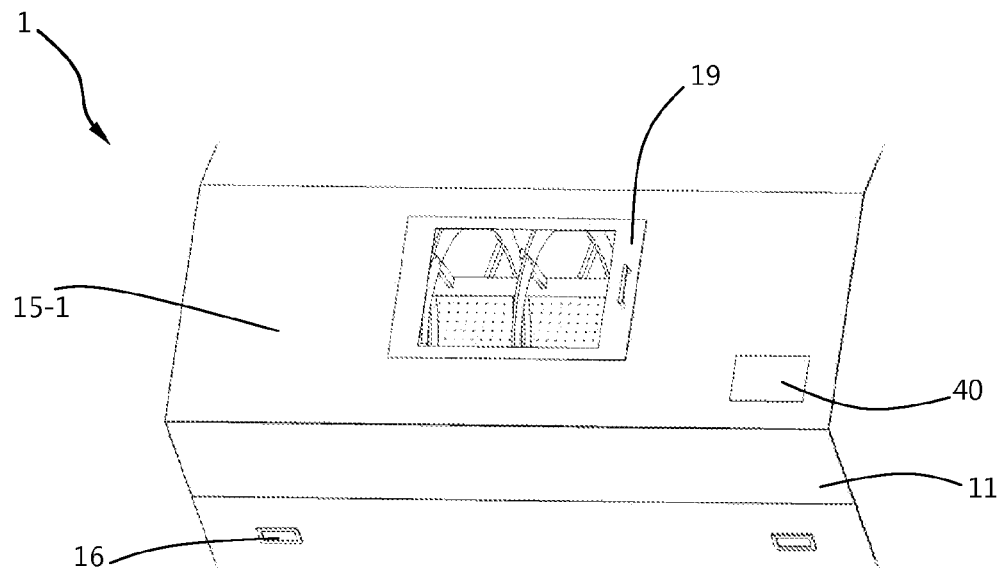
FIG. 4($a$) illustrates a perspective view of the door in closed status and FIG. 4($b$) illustrates a perspective view of the door in open status for the food waste disposal system according to one embodiment of the present invention.
Figure 4:
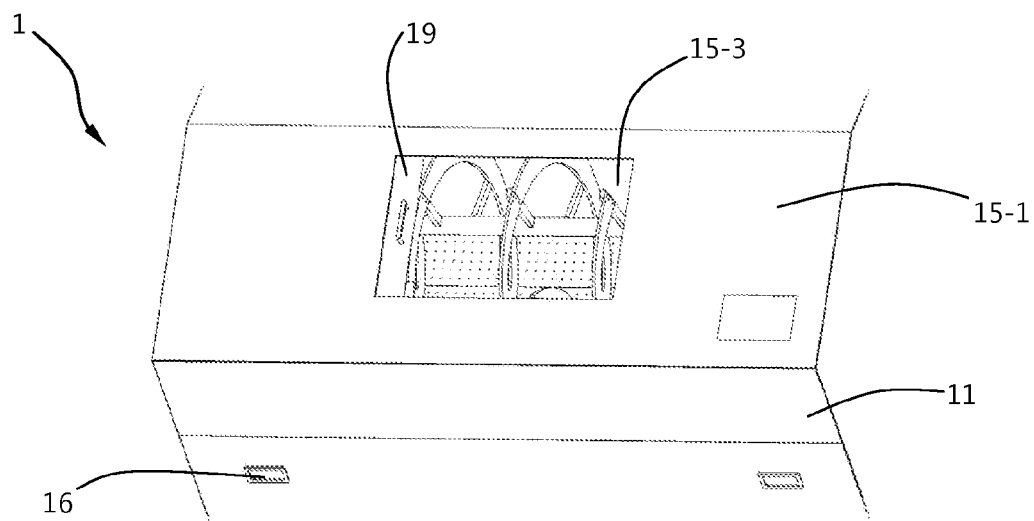

The door 19 located on the introduction hole 15-3, as shown in FIG. 4, is provided with the sliding motion in side ways, left to right motion. The change of opening and closing direction from up-down motion to left-right motion resolves any possible safety concern during the operation. Also, by using the transparent plastic in the middle of the door 19, the user is able to see inside of the mixing basin 20 of the food waste disposal system 1 during the operation, thus real time monitoring by the user is possibly made.

In the above-described housing 10, the mixing basin 20 having an open upper end is installed at a position which is distanced from the bottom of the housing 10, in which the upper end of the mixing basin 20 is aligned with the introduction hole 15-3. A washing chamber 30 is attached at the bottom of the mixing basin 20.

Figure 5:
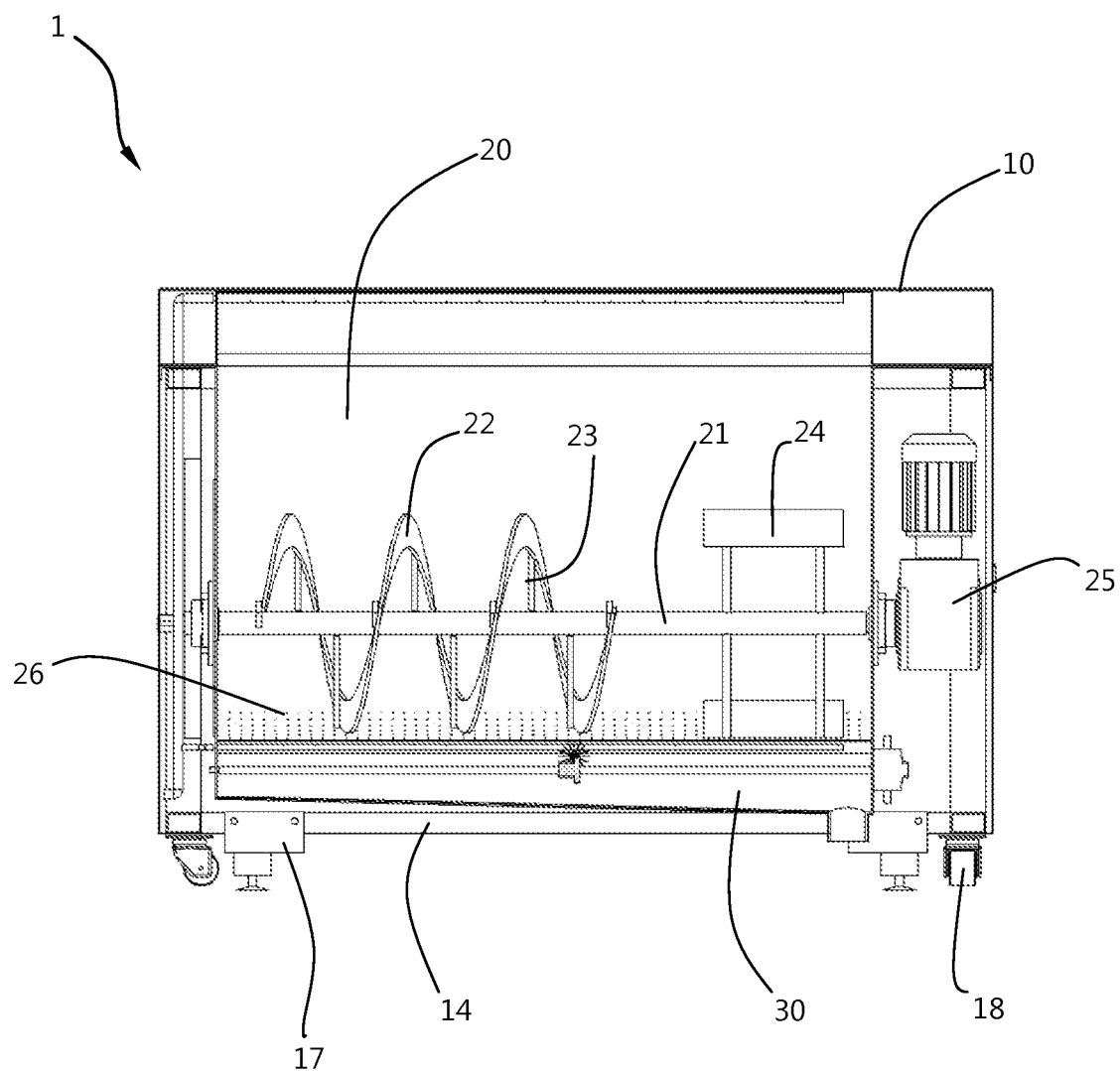
FIG. 5 illustrates a cross sectional view of mixing basin for the food waste disposal system according to one embodiment of the present invention.
Figure 6:
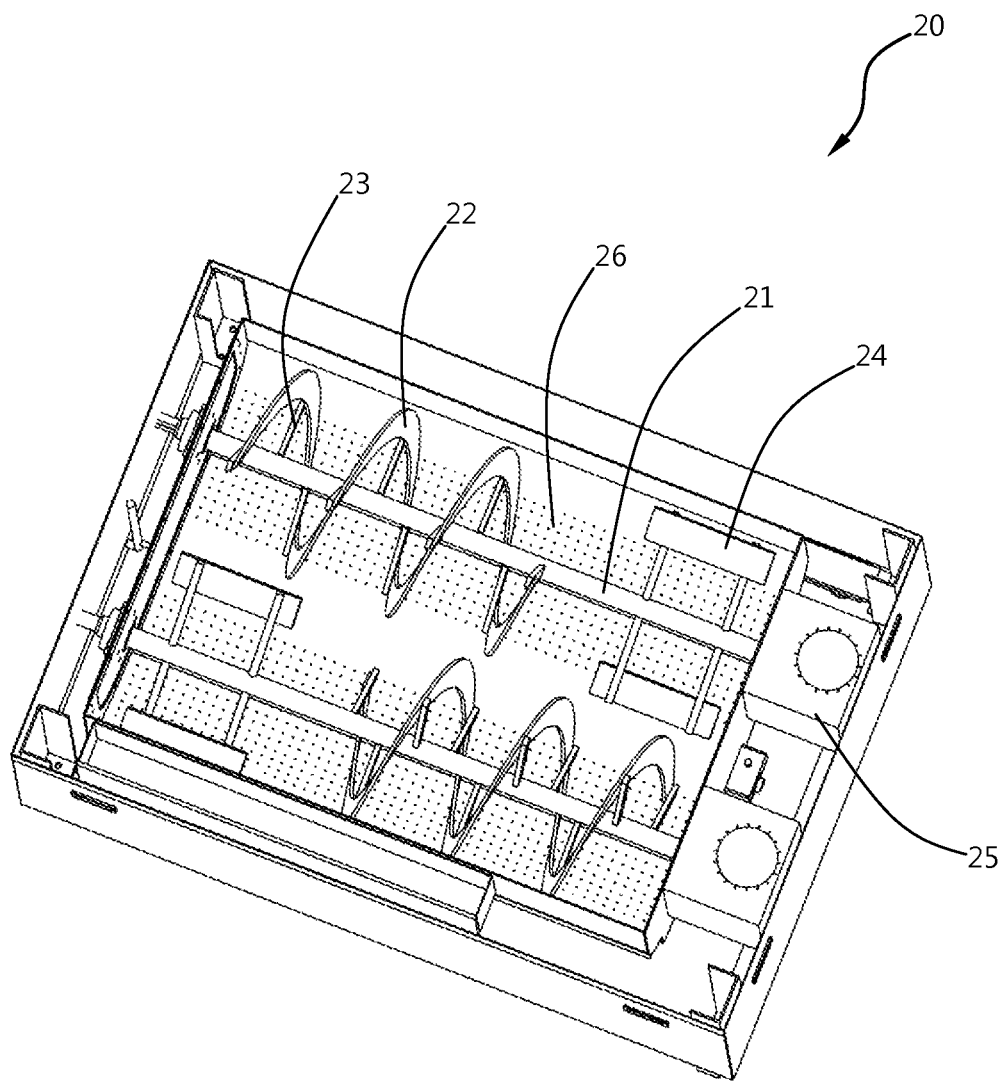
FIG. 6 illustrates a perspective view of mixing basin for the food waste disposal system according to one embodiment of the present invention.
Figure 7:
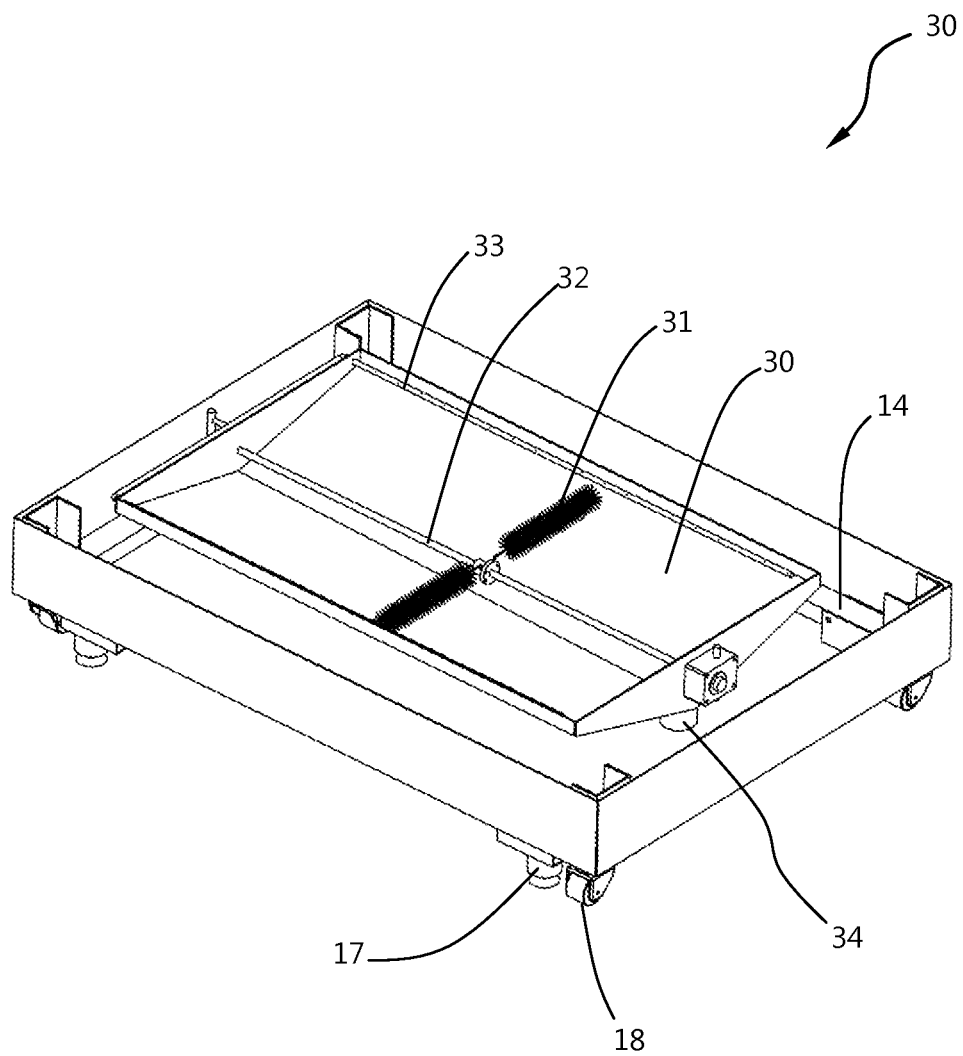
FIG. 7 illustrates a perspective view of washing chamber for the food waste disposal system according to one embodiment of the present invention.

The mixing basin 20 forms an open upper end, as illustrated in FIG. 5 and FIG. 6, in which two rotational shafts 21 are aligned along the horizontal direction of the food waste disposal system 1. A screw-shaped ribbon 22 is arrange around the rotational shaft 21, by which food waste inserted is effectively mixed, crushed and eventually drained out through the washing chamber 30.

The screw-shaped ribbon 22 is attached to the rotational shat 21 by a plurality of ribbon supporter 23. The ribbon supporter 23 can be detached from the rotational shaft 21 so that the replacement of the broken ribbon 22 by the ribbon is possible when required in maintenance routine.

A mixing blade 24 is installed at one end of the rotational shaft 21. When the food waste inside the mixing basin 20 is normally moved to one direction due to the screw motion of the ribbon 22, a mixing blade 24 scoops and transfers the food waste to the other side of the rotational shaft 21. The movement of the food waste forms the closed loop circular motion, which eventually continuous movement of the food waste is possible and prevents any filing up and dead zone problem.

Also, mixing and crushing action by the ribbon 22 and the mixing blade 24 enable the microbes to decompose the food waste more effectively. The continuous movement of the food waste is achieved by the opposite rotation of two rotational shafts 21. A guide motor 25 having a gear reducer is directly connected to the end of the rotational shaft 21 respectively to implement the opposite rotation of the shaft 21.

The direct assembly of the guide motor 25 to the rotational shaft 21 also resolves any problem caused by the chain drive method which is previously used and reduces any maintenance cumbersome to apply lubricant to the chain regularly.

A plurality of perforation 26 formed at the bottom of the mixing basin 20 so that the food waste mixed by the ribbon 22 of the rotational shaft 21 and decomposed by the microbes, goes down to the washing chamber 30 attached beneath the mixing basin 20. The bottom of the washing chamber 30 is tapered in the direction of the center line so the food waste be collected and drained easily by washing mechanism.

A washing chamber 30 attached beneath the mixing basin 20 is formed so as to discharge the food waste coming through the plurality of perforation 26, comprising a brush 31, a linear motion drive 32 to move the brush 31, a pair of washing nozzle pipe 33 to spray water inside the washing chamber 30, and a drain hole attached at the right bottom of the washing chamber 30 to discharge mixture of the food waste and water.

When the food waste containing high viscosity is decomposed inside the mixing basin 20 and passes through the plurality of perforation 26, it sometimes makes a problem to clog the plurality of perforation 26. To prevent this, the linear motion drive 32 is provided with the brush 31 installed perpendicular direction of the linear motion. While the linear drive 32 moves the brush 31 inside the washing chamber 30, the brush 31 sweeps the plurality of perforation 26 mechanically, cleansing out the residue that clogs the plurality of perforation 26. Also, a pair of washing nozzle pipe 33 installed both sides of the washing chamber 30 sprays water during the linear motion of the brush 31, thus not only the mechanical cleansing by the brush 31 but washing action by water spraying are performed at the same time, which prevents any discharge problems due to the clogging of the plurality of perforation 26 and facilitates the discharge process effectively.

As described above, the food waste disposal system according to the present invention is structured in a manner such that four legs are connected to each the housing fixture located at each bottom corner of the housing and a load cell inserted between the housing fixture and the leg, by which the signal measuring the weight of the food waste disposal system is sent to the Programmable Logic Controller (PLC) of the food waste disposal system, and PLC compares the signal with the allowable maximum weight setting. In case of the signal by the load cell is more than the allowable weight setting, PLC sends the warning message to the touch screen installed on the upper cover of the food waste disposal system or turns on the lamp connected to the outside of the food waste disposal system, so that the user notice the overloading and eventually shut down the food waste disposal system to prevent any further breakage of the system.

Also, the screw-shaped ribbon is formed and attached along the rotational shaft by the plurality of ribbon supporters, and two individual shafts rotating by the guide motor installed at the end of the shaft respectively to move and mix food waste continuously, a mixing blade installed at the end of the rotating shaft to scoop and transfer the food waste to the other side of the rotating shaft, and the two shaft rotate in opposite direction to provide the continuous flow of food waste movement inside the mixing basin, increasing mixing process and decomposition process by microbes.

Also, the food waste disposal system comprises a linear motion device installed inside the washing chamber, in which the brush is attached perpendicular to the direction of linear motion, so that the brush mechanically cleans the hole on the perforated plates when the linear motion device moves inside the washing chamber, thus washing chamber is cleaned thoroughly by the water and brush at the same time and increase the discharge effect.

Lastly, provided food waste disposal system comprises the door opens and closes side way, of which the material is transparent plastic, thus the user is able to see inside the mixing basin during the operation to check out the status of the operation real time. Also, the change of the door system from vertical to horizontal opening simplifies the mechanical component, which enhances the durability of the door parts of the food waste disposal system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A food waste disposal system, comprising:
   a. a housing comprised of a support frame, a front plate, a rear plate, and a pair of side plates integrated as a single body for protecting a mixing basin installed therein;
   b. an upper plate formed on the housing with an inclined front upper plate and a rear upper plate;
   c. a plurality of housing fixtures attached at four each lower corners of the support frame respectively; and
   d. a plurality of casters installed so the food waste disposal system can be moved, or, alternatively, fixed in place,
   wherein a mixing basin forms an open upper end, in which two rotational shafts are aligned in parallel along the horizontal direction of said food waste disposal system and a screw-shaped ribbon is connected to each of said rotational shafts by a ribbon supporter, so that food waste inserted in said mixing basin is effectively mixed and crushed and drained out through a washing chamber,
   wherein a mixing blade is installed on at the one end of said rotational shaft, so that the food waste which is moved to one direction due to the screw motion of said ribbon inside said mixing basin is scooped and transferred to the other side of said rotational shaft by said mixing blade, thus the movement of the food waste forms the closed loop circular motion, which eventually continuous mixing of the food waste is possible and prevents any filling up and dead zone problem,
   wherein a washing chamber attached to said mixing basin is formed so as to discharge the food waste coming through a plurality of perforations, comprising a brush, a linear motion drive to move said brush, a pair of washing nozzle pipes to spray water inside said washing chamber, and a drain hole attached at the right bottom of said washing chamber to discharge mixture of the food waste and water.

2. A food waste disposal system according to claim 1, wherein a load cell is located between said housing fixture and said support frame so that said load cell measures the weight of said food waste disposal system and sends the warning message to a control touch panel installed on said front upper plate of said food waste disposal system in case the user inserts more food waste than maximum allowable weight limit of said food waste disposal system.

3. A food waste disposal system according to claim 1, wherein a door installed on an introduction hole located on said inclined upper plate opens and closes in side ways, of which the material is transparent plastic, resolving the user safety concern when said door is closed by its own weight in case of malfunction of said food waste disposal system.

* * * * *